(No Model.)  3 Sheets—Sheet 1.
F. HANCOCK.
TEAPOT, COFFEE POT, &c.
No. 523,344.  Patented July 24, 1894.
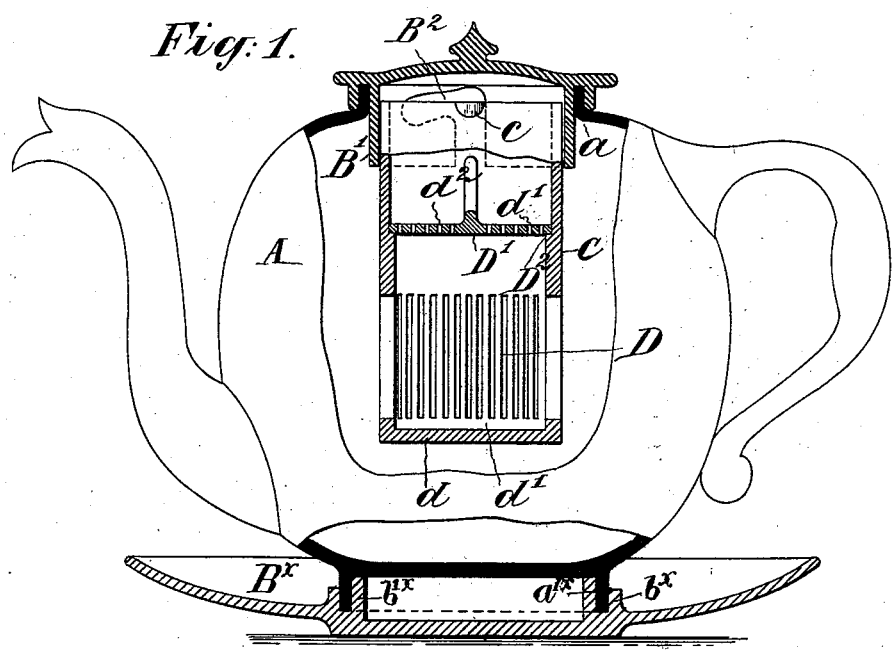
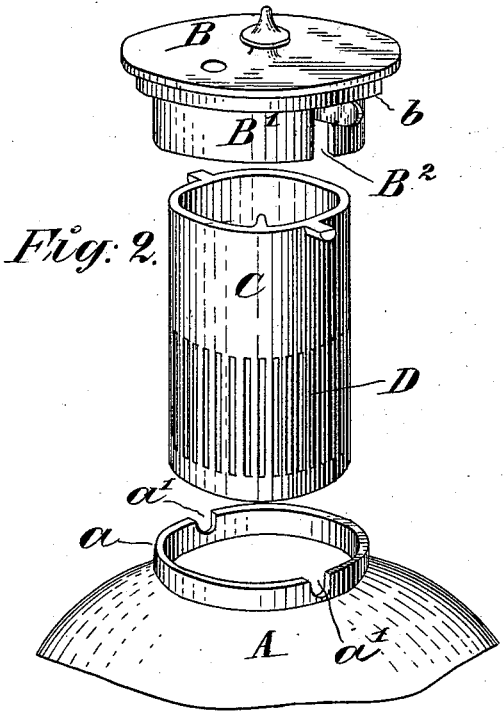
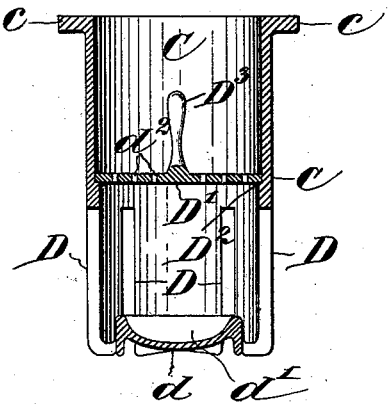
Witnesses:
J. W. Wiman
Peter A. Ross
Inventor:
Frederick Hancock
by Henry Connett
His Attorney (No Model.) 3 Sheets—Sheet 2.

F. HANCOCK.
TEAPOT, COFFEE POT, &c.

No. 523,344. Patented July 24, 1894.

Witnesses
Peter A. Ross
Herbert Blossom

Inventor
Frederick Hancock
by Henry Connett
Atty.

(No Model.) 3 Sheets—Sheet 3.
F. HANCOCK.
TEAPOT, COFFEE POT, &c.
No. 523,344. Patented July 24, 1894.
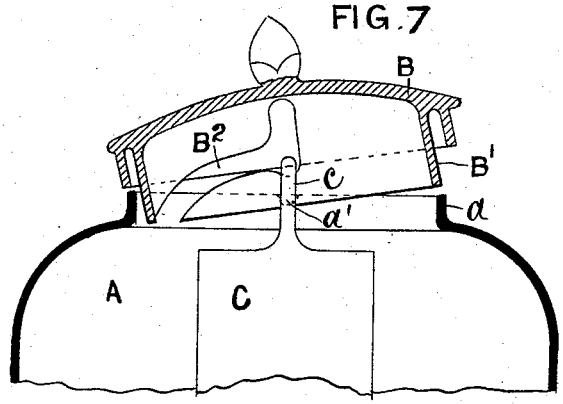
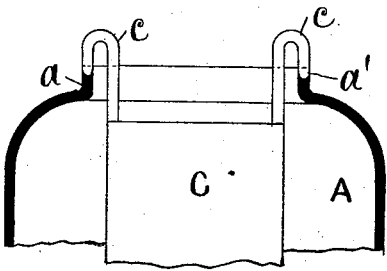
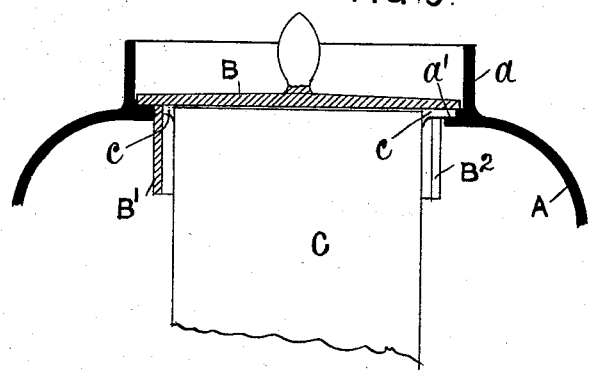
Witnesses
Peter A. Ross
Herbert Blossom
Inventor
Frederick Hancock
by Henry Connett
Atty.

UNITED STATES PATENT OFFICE.

FREDERICK HANCOCK, OF BURSLEM, ENGLAND.

TEAPOT, COFFEE-POT, &c.

SPECIFICATION forming part of Letters Patent No. 523,344, dated July 24, 1894.

Application filed January 19, 1893. Serial No. 458,982. (No model.)

*To all whom it may concern:*

Be it known that I, FREDERICK HANCOCK, a subject of the Queen of Great Britain, residing at Burslem, in the county of Stafford, in the Kingdom of England, have invented certain new and useful Improvements in Teapots, Coffee-Pots, and other Vessels, of which the following is a specification.

This invention has for its object a cover or lid suitable for tea-pots, coffee-pots, kettles, urns, hot-water jugs and the like, which, while being quite separate from the tea-pots, &c., (hereinafter called vessels) having neither hinges nor any other attachments, is so constructed that it cannot accidentally fall off when in use unless the vessel be completely inverted. This object is attained by forming the lid or cover with two rims, an outer and an inner one, of such dimensions as to form (in conjunction with the rim of the vessel) a simple locking device. It is also adapted to engage with a strainer suspended in the vessel in such a manner that, when the lid is removed, the strainer can be removed with it, or, if desired, the lid can be removed without disturbing the strainer.

The manner in which I prefer to carry out the invention may be understood by the following detailed description, reference being had to the accompanying drawings, in which—

Figure 4:
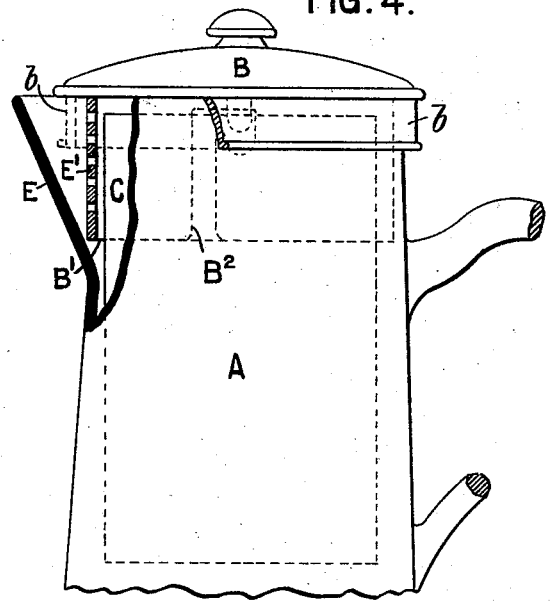

Figure 1 is an elevation, partly in section, of a tea-pot with the improved lid and strainer attachment; Fig. 2, a perspective view of lid, strainer and portion of tea-pot; Fig. 3, a vertical section of an improved strainer; Fig. 4, a side elevation partly in section, and Fig. 5, a front elevation of a coffee-pot with the improved lid and strainer attachment; Fig. 6, a view showing a device for further securing the lid or cover. Figs. 7 and 8 show a method of attaching elliptical covers to the strainer. Fig. 9 represents a lid having only one rim and resting inside the rim of the vessel.

A, is the vessel and B the lid or cover, which is provided with two circular rims B' and b, the inner one B' being preferably much deeper than the outer one b. These rims are adapted to so engage with the rim a of the vessel as to form a locking device which shall make it impossible for the lid to fall off when in ordinary use.

C is a strainer having projections c which rest, when in use, in grooves or recesses a' formed in rim a of the vessel (preferably at right angles to the spout) and by means of which the strainer is suspended. I prefer to arrange the slits D vertical, and, if continued round the curve of the base d as shown in Fig. 3, I have found that about six are sufficient to insure adequate straining. The base d aforesaid is preferably solid and may be enlarged if desired, so that, when taken out of the vessel, it may serve as a stand for the same.

D' is a perforated disk having a handle $D^3$ to facilitate its removal. The said disk may rest loosely on a projection $D^2$ or the strainer may consist of two parts and the disk formed in one with the upper part which can itself be screwed or otherwise secured to the lower part. The tea, coffee, or the like is placed on the disk and any sediment passing through the perforation $d^2$ will collect in the part $d'$ at the bottom of the strainer.

The inner rim B' of the lid or cover B has slots $B^2$ formed therein, each slot taking the form approximately of a right angle, these slots, together with their corresponding projections c, forming bayonet joints which constitute the strainer attachment. The mode of action of the latter is as follows:—The strainer C being suspended in the vessel by means of its projections c, the lid B is put on with the vertical portion of the slots $B^2$ in a line with and passing over the projections c aforesaid, sufficient space being allowed between the rim a of the vessel A and the strainer C, to admit the inner rim B' of the lid. If it be required to lift the strainer C out with the lid B, the latter is slightly rotated, which causes the horizontal portion of the slots $B^2$ to engage with the projections c of the strainer, the same could be indicated by so placing the vent hole in the lid as to be in a line with the spout of the vessel when the connection is made. It will be obvious that the strainer and lid can also be inserted together, and, by rotating the latter in the opposite direction till the vertical portion of the slots is in a line with the projections c, the lid can be removed without the strainer.

Figure 5:
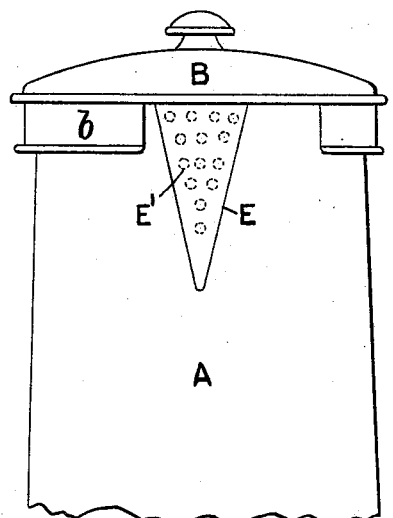
Figure 6:
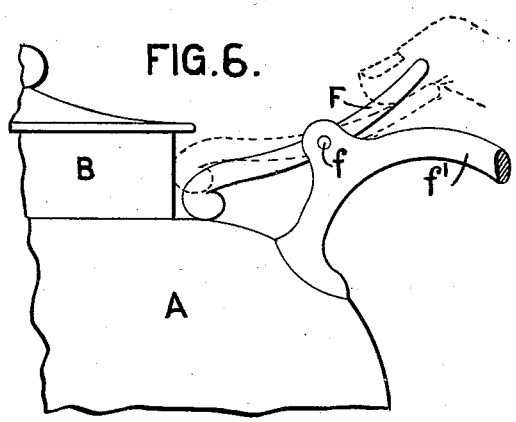

In the case of coffee-jugs, hot water jugs and the like, it will be necessary to cut away a portion of the outer rim b, Figs. 4 and 5, where it would overlap the spout E, also to allow of the lid being rotated when it is required to raise the strainer. The portion E' of the inner rim B' opposite the spout E would also require to be perforated as shown in Fig. 4 to allow for the passage of the liquid. In the case of vessels where perforations E' are provided, I prefer to adopt a tubular spout, so that the vessel (Figs. 4 and 5) would be complete without using the strainer, as the perforated portion E' of the inner rim B' is sufficient to strain the sediment from any liquid with which it is amalgamated and thus obviate cutting away more of the rim B than directly overlaps the lip of jug. The portion E' opposite the spout E may be removed and substituted by a metal one of an elastic nature, attached to the inner rim B' and so arranged that it adheres closely to the side of vessel when the lid is placed therein.

Fig. 6 shows a device which may be employed if necessary to further secure the lid; it consists of a lever or catch F pivoted at $f$ to the handle $f'$ of the vessel, which, when pressed down, as shown in dotted lines, engages with the lid B and holds it firmly in position. It will be evident that a spring or other device may be substituted for the catch, but I think it will be found quite unnecessary to use any of them with the improved lock lid.

The above description applies only to lids having circular rims. In the case of lids or covers having elliptical, octagonal or other irregular shaped rims which cannot be rotated, the projections $c$ (Figs. 7 and 8) of the strainer C are carried up above the same and formed into a loop, the outer part of which rests in the grooves $a'$ in the rim $a$ of the vessel. The slots $B^2$ in the inner rim B' are of the form shown in Fig. 7. To put the lid on, it is first placed at an angle and slid down with the slots $B^2$ engaging the looped projections $c$ until it arrives at the position shown in Fig. 7, when it is dropped into position on the vessel. If the lid be raised vertically, it will take the strainer with it, but, by taking the lid off at an angle, it can be removed without the strainer.

The construction employing two rims, as B' and $b$, adapted to embrace a rim on the vessel, may be employed at the bottom of the latter as well as at the top, to prevent the vessel from being overturned too easily, as when used on shipboard for example. In Fig. 1 for example the pot or vessel A has a rim $a'^\times$ which engages an annular recess between two rims $b^\times$ and $b'^\times$, on a tray $B^\times$.

I declare that what I claim is—

1. In combination with a tea-pot or other vessel, a strainer formed of a hollow receptacle, C, perforated at the lower part, and provided with projections, $c$, at the top which rest, when in use, in grooves or recesses in the rim of the vessel, substantially as described.

2. The combination with a tea-pot or like vessel, of a cover, B, having a pendent rim, $b$, which embraces the rim of the vessel, and a locking lever, fulcrumed on or adjacent to the handle of the vessel, the operative end of said lever is adapted to bear forcibly against the cover-rim when the outer arm of the lever is depressed, as set forth, whereby the cover is steadied in pouring from the vessel.

In testimony whereof I have signed my name to this specification in the presence of two subscribing witnesses.

FREDERICK HANCOCK.

Witnesses:
 JOHN ARROWSMITH,
 JOHN HORTON.